UNITED STATES PATENT OFFICE.

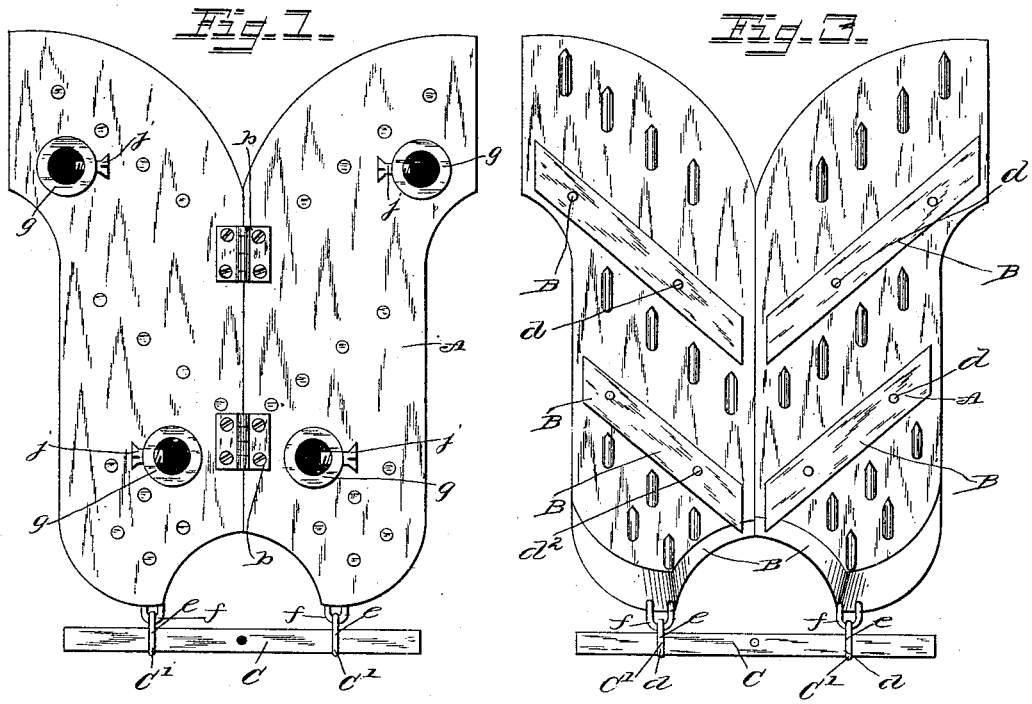

WILLIAM E. KINNEAR, OF FREMONT, OHIO.

COMBINED HARROW, CULTIVATOR, AND CLOD-CRUSHER.

SPECIFICATION forming part of Letters Patent No. 329,748, dated November 3, 1885.

Application filed July 27, 1885. Serial No. 172,792. (No model.)

*To all whom it may concern:*

Be it known that I, WILLIAM E. KINNEAR, a citizen of the United States of America, residing at Fremont, in the county of Sandusky and State of Ohio, have invented certain new and useful Improvements in Combined Harrow, Cultivator, and Clod-Crusher, of which the following is a specification, reference being had therein to the accompanying drawings.

My invention relates to an improved agricultural implement which may be employed as a harrow, cultivator, and clod-crusher; and it consists in the peculiar construction, combination, and arrangement of the parts, substantially as hereinafter more fully shown and described, and particularly pointed out in the claims.

In the accompanying drawings, Figure 1 is a plan view of my improved agricultural implement. Fig. 2 is a cross-section thereof. Fig. 3 is a second plan view thereof, showing the device inverted; and Fig. 4 is a detail view.

In the construction of my combined harrow, cultivator, and clod-crusher I construct the platform A in two corresponding sections, and unite them together by means of the hinges $b$ and the clod-bar C, and secure in the platform A vertical harrow-spikes to form a harrow, as usual. To the bottom of this platform I also removably attach, by means of nutted screw-bolts $d$, the beveled pieces B, which are ordinarily aligned thereon in correspondingly oblique positions, as shown.

The object of removably securing the beveled pieces B to the platform is that when my device is used as a cultivator, as will be explained further on, the said pieces can, if desired, be removed therefrom. The thicker or larger sides of these beveled pieces are presented to and impinge slightly or tightly press against the surface-soil, as they are designed for the purpose of "hilling" the corn; but their position on the platform may be varied at intervals, as required, to suit the character of the intended work. The clod-bar C is slightly recessed transversely at C', and the links $e$, which interlink with the staples $f$, are bent and forced into the recesses, and the staples $f$ are then driven one into the front end of each platform-section, as shown. The clod-bar C acts as an adjunct in holding the sections together while permitting them to adjust their position to suit the inequalities of the soil; but the chief object of the clod-bar C, which also serves as a draft-bar, is to spread out and force the larger clods under the platform to be operated upon by the harrow.

I secure to the platform A four (more or less) sockets, $g$, (see Fig. 4,) having shanks $h$. These shanks are projected through coincident orifices in the platform, their shoulders $i$ resting thereon, and are secured therein by pins on the under side thereof.

In attaching my agricultural implement to a cultivator I remove the hinges $b$, the clod-bar C, also the shovels of the cultivator, insert the shovel-standards in the sockets $g$, and secure the same therein by tightening thereon the horizontal thumb or other screw, $j$, which securely holds the harrow as against accidental release from the cultivator.

Having thus fully described my invention, what I claim, and desire to secure by Letters Patent, is—

1. In an agricultural implement, the combination, with the hinged platforms and the beveled pieces removably secured thereto, of the clod-bar secured to the forward ends of the platforms, substantially as shown and described.

2. An agricultural implement for use as a cultivator, consisting of the platforms having the teeth secured thereto, the sockets having screws and attached to said platforms, and the removably-secured beveled pieces, substantially as shown and described.

In testimony whereof I affix my signature in presence of two witnesses.

WILLIAM E. KINNEAR.

Witnesses:
B. R. DUDROW,
M. G. THRAVES.